(12) United States Patent
Schaad (10) Patent No.: US 10,588,453 B2
(45) Date of Patent: Mar. 17, 2020

(54) CONTINUOUS FLOW FOOD DEFROSTER (71) Applicant: Bill Schaad, Morrison, CO (US)

(72) Inventor: Bill Schaad, Morrison, CO (US)

(*) Notice: Subject to any disclaimer, the term of this patent is extended or adjusted under 35 U.S.C. 154(b) by 432 days.

(21) Appl. No.: 15/422,835

(22) Filed: Feb. 2, 2017

(65) Prior Publication Data
US 2017/0224153 A1  Aug. 10, 2017

Related U.S. Application Data (60) Provisional application No. 62/291,863, filed on Feb. 5, 2016.

(51) Int. Cl.
A47J 36/24 (2006.01)

(52) U.S. Cl.
CPC .......... A47J 36/24 (2013.01); A47J 36/2405 (2013.01)

(58) Field of Classification Search
None
See application file for complete search history.

(56) References Cited

U.S. PATENT DOCUMENTS

| 2,137,676 | A | 11/1938 | Martin |
| 2,219,393 | A | 10/1940 | McAdam |
| 3,402,763 | A | 9/1968 | Peterson |
| 3,636,308 | A | 1/1972 | Hatch |
| 3,823,661 | A | 7/1974 | Kells |
| 3,859,981 | A | 1/1975 | Yoshida |
| 4,062,277 | A | 12/1977 | Powers |
| 4,163,471 | A | 8/1979 | Leder |
| 4,597,435 | A | 7/1986 | Fosco, Jr. |
| 4,874,033 | A | 10/1989 | Chatelain et al. |
| 5,015,421 | A * | 5/1991 | Messner ............ B01F 3/04241 160/380 |
| 5,146,843 | A | 9/1992 | Fuller et al. |
| 5,979,363 | A * | 11/1999 | Shaar .................... A01K 61/59 119/230 |
| 8,117,961 | B2 | 2/2012 | Sann |
| 9,155,288 | B1 * | 10/2015 | Ting .................... A01K 63/003 |
| 2004/0031284 | A1 * | 2/2004 | Thompson ............ A23L 3/365 62/342 |
| 2008/0216673 | A1 | 9/2008 | Takenaka |
| 2013/0062038 | A1 | 3/2013 | Pearson |
| 2013/0323386 | A1 | 12/2013 | Luketic et al. |
| 2015/0007588 | A1 | 1/2015 | Cantrell et al. |

FOREIGN PATENT DOCUMENTS

| CN | 2817466 | 9/2006 |
| DE | 2358131 | 5/1975 |
| FR | 2770374 | 5/1999 |
| JP | 2000116316 | 4/2000 |

* cited by examiner

Primary Examiner — Ibrahime A Abraham
Assistant Examiner — Elizabeth M Sims
(74) Attorney, Agent, or Firm — Snell & Wilmer LLP (57) ABSTRACT Presented herein is a system and a method (i.e., utility) for use in defrosting frozen food items. The utility is directed generally to a device and its use that directs a flow of a defrosting fluid (e.g., water) into a lower portion of a basin where the water passes upwards to the rim of the basin to defrost frozen items placed in the basin.

6 Claims, 9 Drawing Sheets

CONTINUOUS FLOW FOOD DEFROSTER

CROSS REFERENCE

The present application claims the benefit of the filing date of U.S. Provisional Application No. 62/291,863 having a filing date of Feb. 5, 2016, the entire contents of which is incorporated herein by reference.

FIELD

The present disclosure generally relates to food processing techniques. More specifically, the present disclosure relates to immersion food defrosting.

BACKGROUND

Restaurant food preparation often requires defrosting frozen items (entrees, meat etc.). Conventionally, frozen food items (e.g., sealed in a plastic bag) are defrosted by continuously running water over the frozen food item (e.g., placed in a sink) until the temperature of the item is brought to a proper state for preparation. In some cases, frozen food items may additionally be immersed in water for defrosting. However, health regulations and food safety concerns typically may prevent the food item from sitting in water for an extended period of time. For instance, heath regulations often require that water in which a frozen food item is immersed be continually flowing to prevent or reduce bacterial growth. Thus, frozen food items are sometimes immersed in a basin of water and a faucet or other spigot continually pours water into the basin. In such 'immersion defrosting' the basin is typically placed in a sink such that water overrunning the top of the basin spills into the sink and is diverted to a drain.

The conventional method for immersion defrosting has several drawbacks. One drawback is that water is provided to the top of the basin holding the frozen item. The frozen item tends to cool the water in the basin such that colder water settles to the bottom of the basin while the typically warmer water from the faucet tends to run over the top edge of the basin. The thermal potential of the warmer water is wasted. A common practice to facilitate mixing the colder water in the bottom of the basin with water flowing into the basin is to increase the flow of water into the basin. However, this results in significantly increased water use. Further, increased flow of water directly into the basin tends to cause splashing of water.

As such, there is a need for a system that defrosts food efficiently, effectively and while reducing water usage.

SUMMARY

Presented herein is a system and a method (i.e., utility) for use in defrosting frozen food items. The utility is directed generally to a device and its use that directs a flow of a defrosting fluid (e.g., water) into a lower portion of a basin where the water passes upwards to a rim or top edge of the basin to defrost frozen items placed in the basin.

According to a first aspect, the utility includes a manifold that is adapted to be disposed within a basin or tub. The basin may be have any shape but typically includes a base and continuous sidewall (e.g., rectangular, circular, etc.) and a top edge (i.e. top of the sidewall). The basin defines an interior area for holding fluid/water and one or more items to be defrosted. A manifold is disposed within the basin at or near its base. The manifold includes an upper surface having a plurality of apertures that allow for dispersing water received below the manifold into the basin near the bottom of the basin. In order to insert water below the manifold, a riser is attached to the manifold. The riser is generally a conduit having an open inlet end and an open outlet end. The open outlet end of the riser/conduit opens below the upper surface of the manifold. The open inlet end of the riser extends above the top edge of the basin when the manifold is disposed within the basin. This allows providing water into the riser which is then directed to a space below the manifold allowing the water to disperse through the apertures in the manifold.

The riser may be formed of any appropriate conduit. In one arrangement, the riser is formed of a flexible conduit that attaches (e.g., threads) to a connection port in the manifold. In other arrangements, the riser is a rigid element that is fixedly connected the manifold.

In one arraignment, the manifold is a self-contained element. In this arrangement, the manifold defines an enclosed area. In this arrangement, an outlet of the riser opens into the enclosed are to provide fluid/water received at a location above the top edge of the basin into the enclosed area. In another arrangement, the manifold is a plate that is sized to provide an interference fit with an interior of the basin. In this arrangement, the plate is disposed above the base of the basin to define a space between the base and a bottom surface of the plate. In such an arrangement, the riser opens through the bottom surface of the plate. In the interference fit arrangement, a peripheral edge of the manifold plate may have a shape that is substantially similar or identical to an interior periphery of the basin. Further, a seal may be attached to the peripheral edge of the manifold plate.

According to another aspect, the utility includes an enclosed manifold base that is sized for receipt within a basin. The manifold base has a bottom surface, which rests on the base of the basin, and a spaced top surface. Edges of the spaced top and bottom surfaces are connected, for instance, by one or more sidewalls. In any arrangement, the manifold base defines an enclosed space. Water flows into the manifold via riser having a lower end that is in fluid communication with the enclosed space between the top and bottom surfaces of the manifold base. The riser extends upward from the manifold base to a location above a top edge of the basin. An open upper end of the riser receives water from a water source. The manifold base, the enclosed interior of which receives water from the manifold riser, has a plurality of apertures on its top surface. When water flows into the manifold riser, fluid pressure forces water out of the apertures in the top surface of the manifold base, into the basin (e.g., past a frozen item in the basin). The water raises and spills over the top edge of the basin.

In any aspect, rather than colder water settling at the bottom of the basin, newly inserted water (e.g., warmer water) circulates from the bottom of the basin and past the food item(s) located on or above the top surface of the manifold. In use, the flow of water into the riser may be adjusted to prevent water from overflowing the top edge of the riser. In some arrangement, indicia lines on the riser allow a user to control the volumetric flow of the water. The application of the water to the bottom of the basin significantly increases the thawing of a food item placed into the basin. Further, this can be achieved with a lowered water flow rate thereby saving water while adhering to health guidelines that require a continuous flow of water. Even further, introducing water through the bottom of the basin via the manifold riser eliminates any splashing.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Disclosed herein are devices and techniques related to food processing, and more specifically, to immersion food defrosting devices and their use, which allow thawing frozen food items in conformance with health regulations while reducing water usage in comparison to previous techniques. In the present disclosure, the immersion food defrosting devices provide continuous fluid flow to the bottoms of immersion basins allowing rapid thawing of frozen food items while reducing water use.

FIGS. 1-4 variously illustrate a first embodiment of an immersion food defrosting device 20 and a basin 10 in which the device 20 is disposed. Generally, the device 20 forms a self-contained manifold that allows for receiving a flow of a defrosting fluid (hereafter water) at a location above a top edge of the basin 20 and directing that fluid to a bottom of the basin 20. This allows the typically warmer water (i.e., newly received water) from, for example, a faucet to pass upward from the bottom of the basin past a frozen food item 2 immersed within the basin prior to spilling over the top edge of the basin. This arrangement allows more fully utilizing the thermal potential of newly received water for defrost the frozen food item 2. More importantly, this allows for reducing the volumetric flow of the water thereby reducing water usage while thawing/defrosting the frozen food item at a rate equal to or exceeding prior methods.

Figure 1:
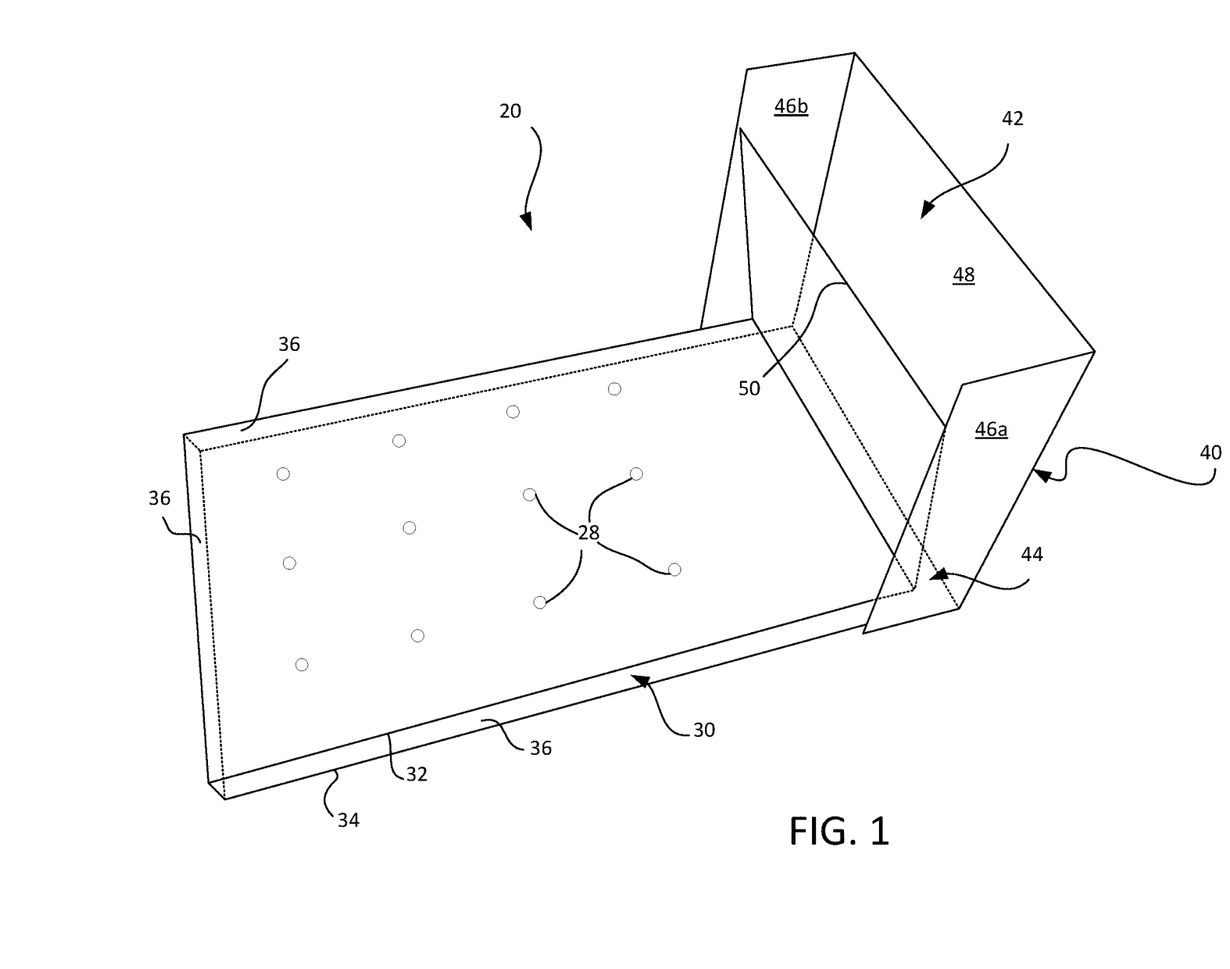
FIG. 1 illustrates a perspective view of a first embodiment of an immersion food defrosting device.
Figure 2:
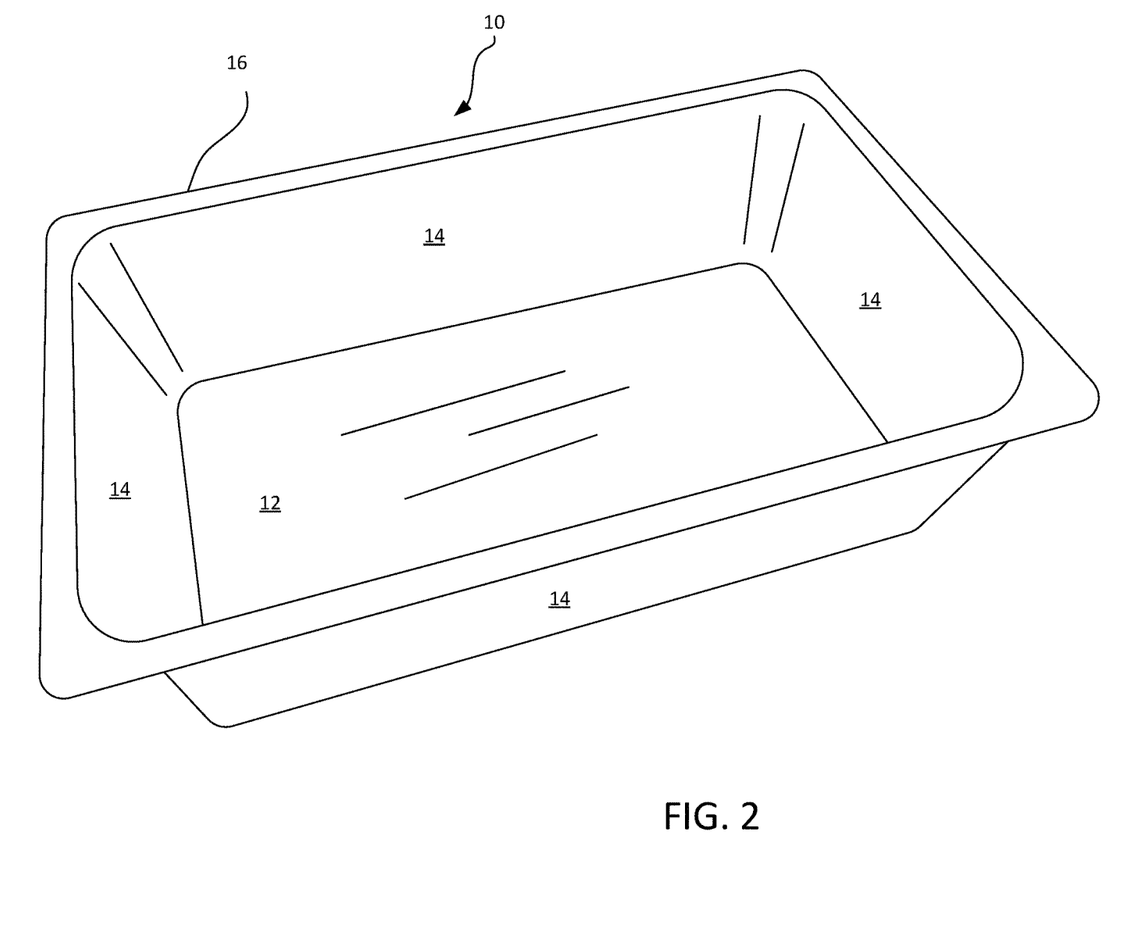
FIG. 2 illustrates a perspective view of an exemplary basin in which an immersion food defrosting device may be placed.
Figure 3:
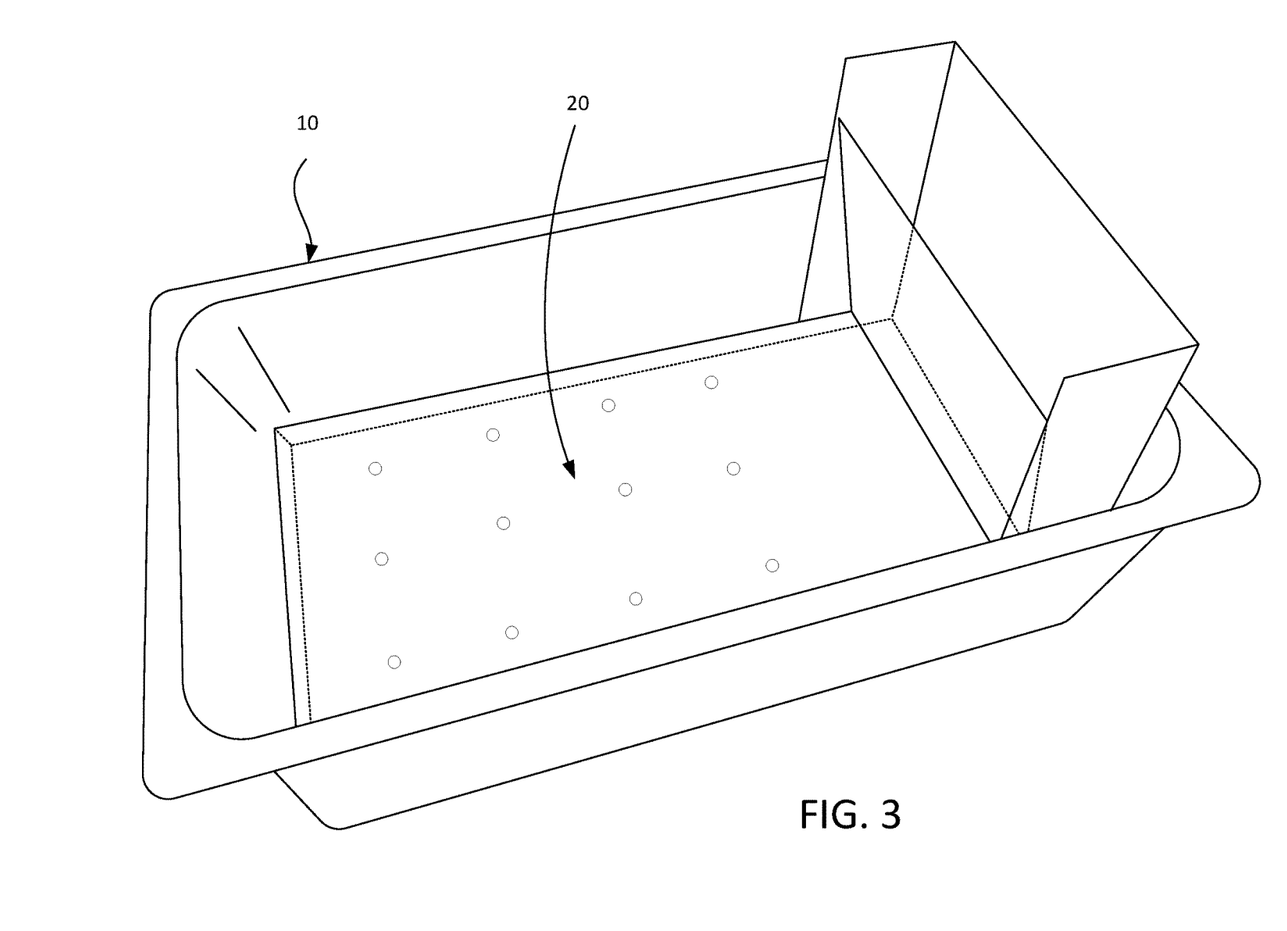
FIG. 3 illustrates the immersion food defrosting device of FIG. 1 placed in the basin of FIG. 2.
Figure 4:
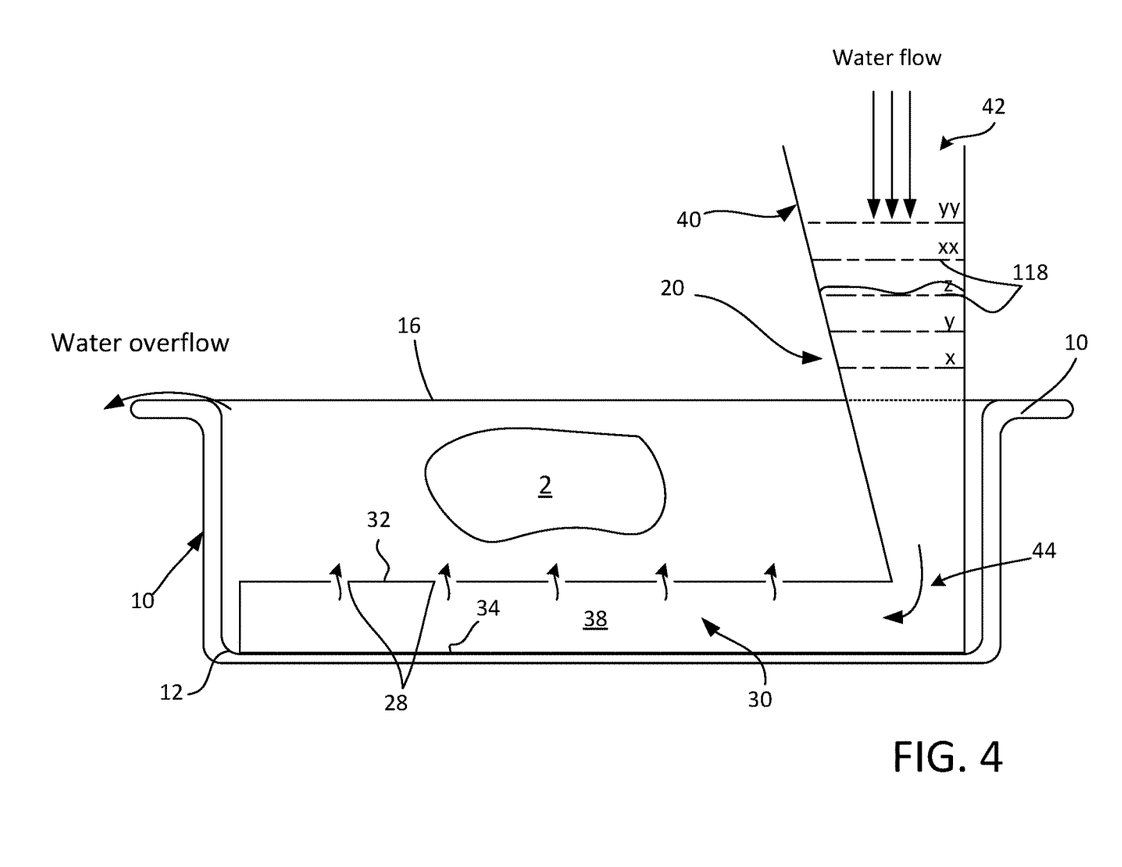
FIG. 4 illustrates a cross-sectional view of the immersion food defrosting device of FIG. 1 placed in the basin of FIG. 2.
Figure 5:
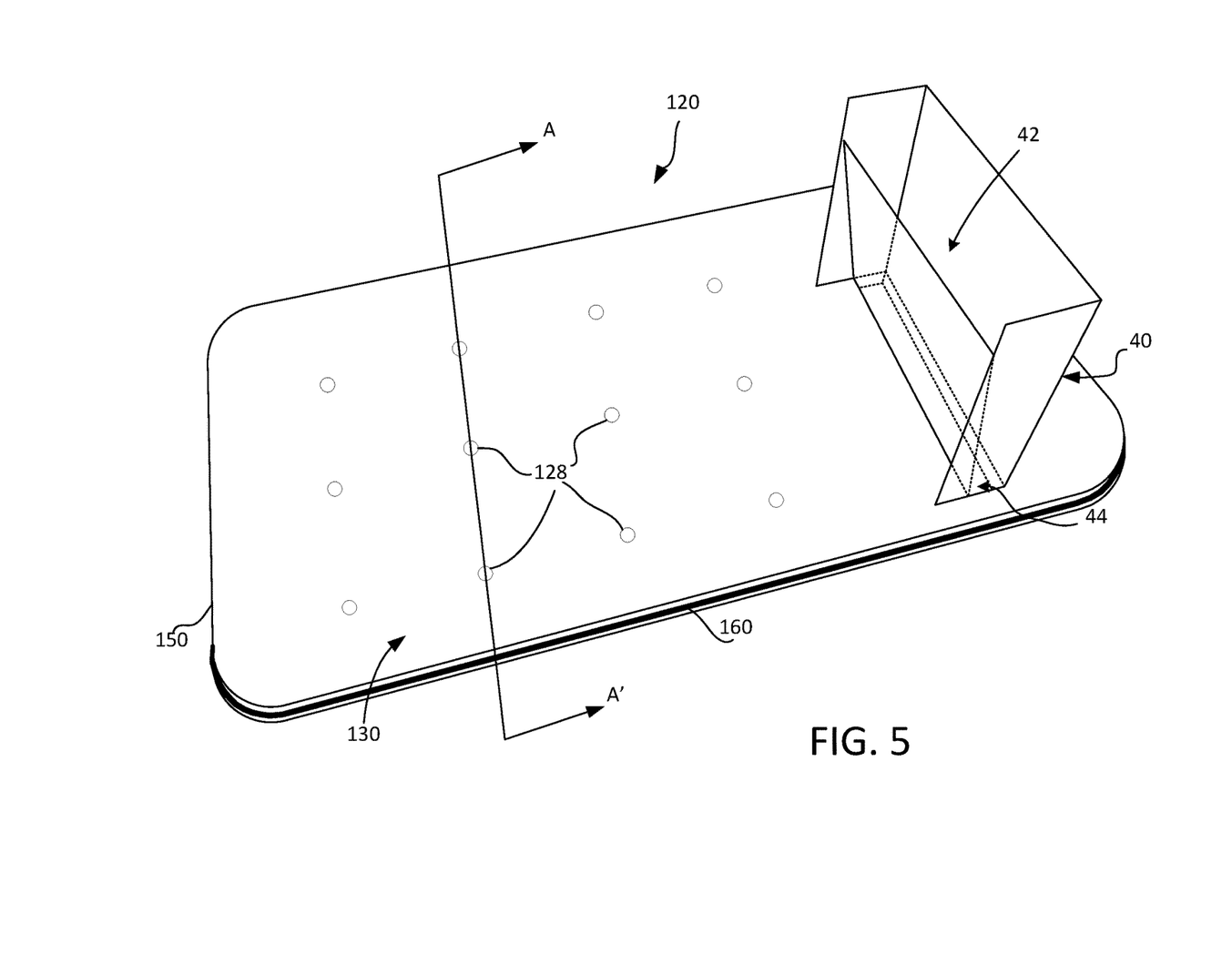
FIG. 5 illustrates a perspective view of a second embodiment of an immersion food defrosting device.

FIGS. 1, 3 and 4 illustrate a perspective and cross-sectional side view of the first embodiment of the defrosting device 20. As shown, the defrosting device 20 generally defines a manifold that may be placed within the basin 10. See, e.g., FIGS. 3 and 4. The device has a body or manifold body 30 having a top surface 32 and a bottom surface 34 connected by a plurality of sidewalls 36. The top and bottom surface are spaced to define an enclosed interior area 38. The manifold body 30 is sized to be disposed on the bottom surface or base 12 of the basin 10. In the illustrated embodiment, the top surface 32, bottom surface 34, and side walls 36 define a rectangular prism while the basin 10 is illustrated as being generally rectangular. However, the manifold body 10 may be of any shape that defines an enclosed area while the basin may have any shape that permits receipt of the manifold body 30. For example, the manifold body and/or basin may be cylindrical. In any embodiment, the height or thickness of the manifold body 30 between its top surface 32 and is bottom surface 34 is less a height of the sidewalls 14 of the basin 20. See. e.g., FIGS. 2, 3 and 4. Thus, when the manifold body 30 is disposed within the basin 10, there is adequate space between the top surface 32 of the manifold body 30 and a top edge 16 of the basin 10 to allow a frozen food item 2 to be placed therein and/or on top of the top surface 32 of the manifold body. However, it will be appreciated that a frozen food item 2 may extend above the top edge 16 of the basin 10 when placed on the top surface 32 of the manifold body 30. In such a case, the frozen food item 2 may be rotated or turned over to allow for defrosting fluid to contact and defrost all surfaces of frozen item.

The enclosed interior area 38 of the manifold body 30 is connected to an upright fluid intake tube or riser 40. In the present embodiment, the riser 40 is a rigid element attached hear a first end of the manifold body. The riser 40 is generally a hollow conduit having a continuous sidewall (i.e., which may be formed of a single or multiple elements) that extends between an open inlet end 42 and an outlet end 44. The inlet end 42 of the riser 40 is sized to receive water from a fluid source (e.g., faucet or spigot). The outlet end 44 of the riser is in fluid communication with the interior area 38 of the manifold body 30. As illustrated, the riser connects to one end of the manifold body 30 such that the outlet end 44 of the riser opens into the top surface 32 of the manifold body 30. That is, the interior of the riser 40 is in fluid communication with the interior area 38 of the manifold body. However, it will be appreciated that the outlet 44 of the riser 40 may fluidly connect to the interior area 38 of the manifold body 30 at other locations (e.g., sidewall, bottom surface etc.). The riser 40 has a height that extends from a connection point with the manifold body to a location above the top edge 16 of the basin 10 in which the device 20 will be disposed. Thus, water received at the inlet end 42 of the riser 40 is directed into the interior area 38 of the manifold body 30, which is disposed at or near the base 12 of the basin 10 and below a frozen food item 2 disposed/immersed within the basin 10.

A plurality of apertures 28 extend through the top surface 32 of the manifold body 30 to fluidly connect its interior area 38 with the interior of the basin 10 to disperse water to a lower portion of the basin. Accordingly, the riser 40 directs water 100 from the inlet end 42 disposed above the top edge 16 of the basin 10 into the interior area 38 of the manifold body 30. This water then passes through the plurality of apertures 28 located through the top surface 32 of the manifold body 30 and disperses into the interior of the basin near the bottom of the basin. This arrangement allows directing a flow of newly inserted water (e.g., warmer water) to or near the bottom of the basin 10 such that it may pass upward past a frozen food item 2 disposed within the basin 10. The water flows through the apertures 28 into the lower portion of the basin flows upward displacing water in an upper portion of the basin 10, which overflows the top edge 16 of basin 10 into, for example a sink. The water may flow into drain or alternatively it may be fully or partially recycled back into the manifold riser 40.

In the illustrated embodiment of FIG. 1, the continuous sidewall of the riser 40 has a first and second sidewalls 46*a*, 46*b*, a rear wall 48 and a slanted front wall 50, which collectively define the hollow interior of the riser 40. In this embodiment, the slanted front wall 50 allows the interior area of the riser to taper from a larger upper inlet end 42 to a narrower lower outlet end 44. The sidewalls 46*a*, 46*b* walls extending between the front and rear walls may also taper (not shown) in alternate embodiments. The use of a tapered riser increases the amount of water in the riser, thereby increasing the head pressure therein. In the illustrated embodiment, the manifold riser 40 extends entire width of manifold base, however, this is not a requirement. Further, it will be appreciated that use of a tapered riser is not a requirement. That is, the physical configuration of the riser may vary. By way of example only, the riser may be formed of a cylindrical tube or any other structure that allows fluid to enter the riser at a location above a top edge of a basin and be delivered to the interior of the manifold body.

A frozen food item or items 2 may be placed directly on the top surface 32 of the manifold body 30 and/or float within the basin for defrosting. Having the apertures 28 (i.e., the source of newly inserted water into the basin) at or near the bottom of the basin 10, promotes mixing of the fluid in the basin preventing stratification of water. That is, cold water does not settle to the bottom of the basin and water is mixed within the basin without increasing flow of the water.

Figure 9:
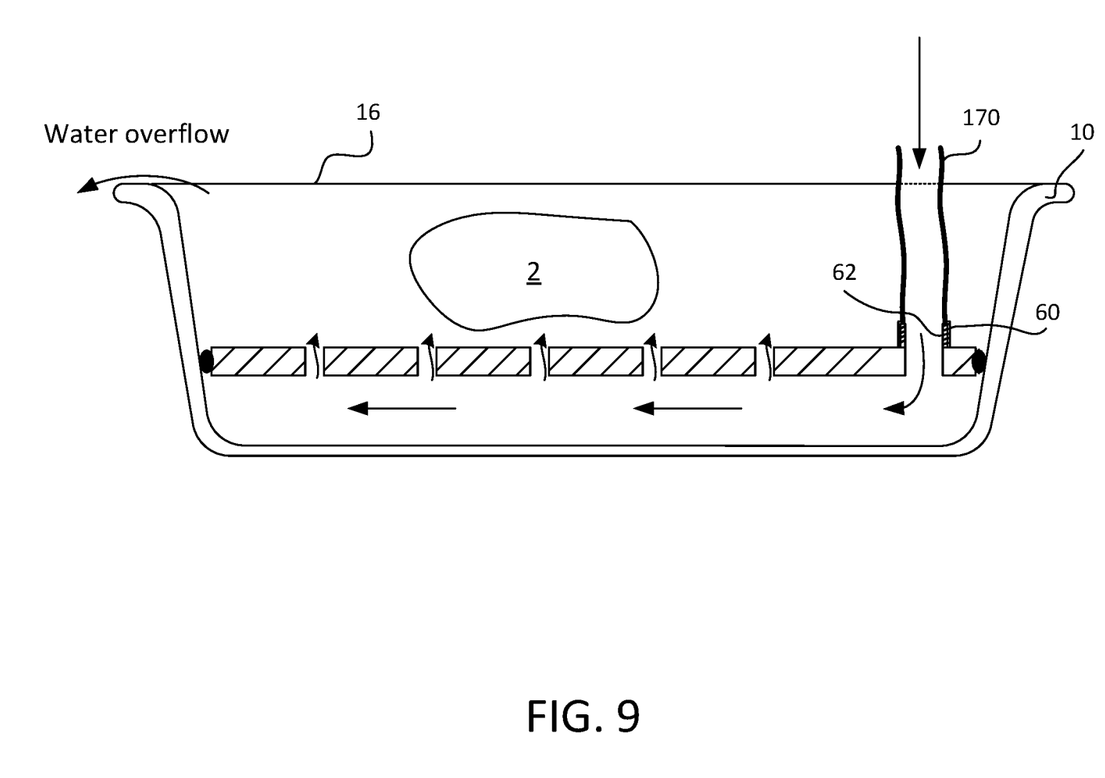
FIG. 9 illustrates a cross-sectional view of a third embodiment of an immersion food defrosting device.

As noted, the riser 40 extends above the top edge 16 of the basin 10. Providing a riser with an inlet opening above the top edge 16 of the basin 10 provides fluid head pressure to drive the fluid through the apertures 28. The height of riser 40 may be selected based on basin size, desired flow rates etc. In the present embodiment the upright rigid riser 40 has an open inlet 42 to receive water from any suitable source. For example water from a faucet or hose may be used as a water source to direct water into the open inlet end of the riser. In an alternative embodiment a fluid source may be in direct connection 60 (e.g., interference fit, threaded etc.) with a mating connection inlet 62 of the manifold 160 (see e.g., FIG. 9). In such an embodiment, the riser may be a non-rigid element such as a flexible conduit or hose 170. When assembled, a connected water source may provide direct water pressure to the manifold as opposed to head pressure. A water source in such direct connection to the manifold may thus supply water through the apertures 128 with sufficient direct pressure to fill and overflow the top edge 16 of the basin 10.

FIGS. 5-8 illustrate a second embodiment of immersion food defrosting device 120. This second embodiment of the device 120 again includes a riser 40 that allows for receiving fluid from a location above a top edge 16 of a basin 10 such that flowing water may be directed below food placed within a basin 10. Again, the riser may be formed of any conduit having a continuous sidewall between an open inlet end 42 and an open outlet end 44. In contrast to the device 20 of the first embodiment, the present device 120 does not form a self-contained manifold. Rather, the device 120 includes a body or manifold plate 130 having a plurality of apertures 128 that extend through the plate between a top surface 132 and a bottom surface 134 of the manifold plate 130. As illustrated, the riser 40 is substantially identical to the riser described in relation to FIGS. 1, 3 and 4 with the exception that the outlet end 44 of the rise extends through the bottom surface 134 of the manifold body or manifold plate 130 rather than into an enclosed interior area of a manifold body. Further, the physical configuration of the riser may vary.

Figure 6:
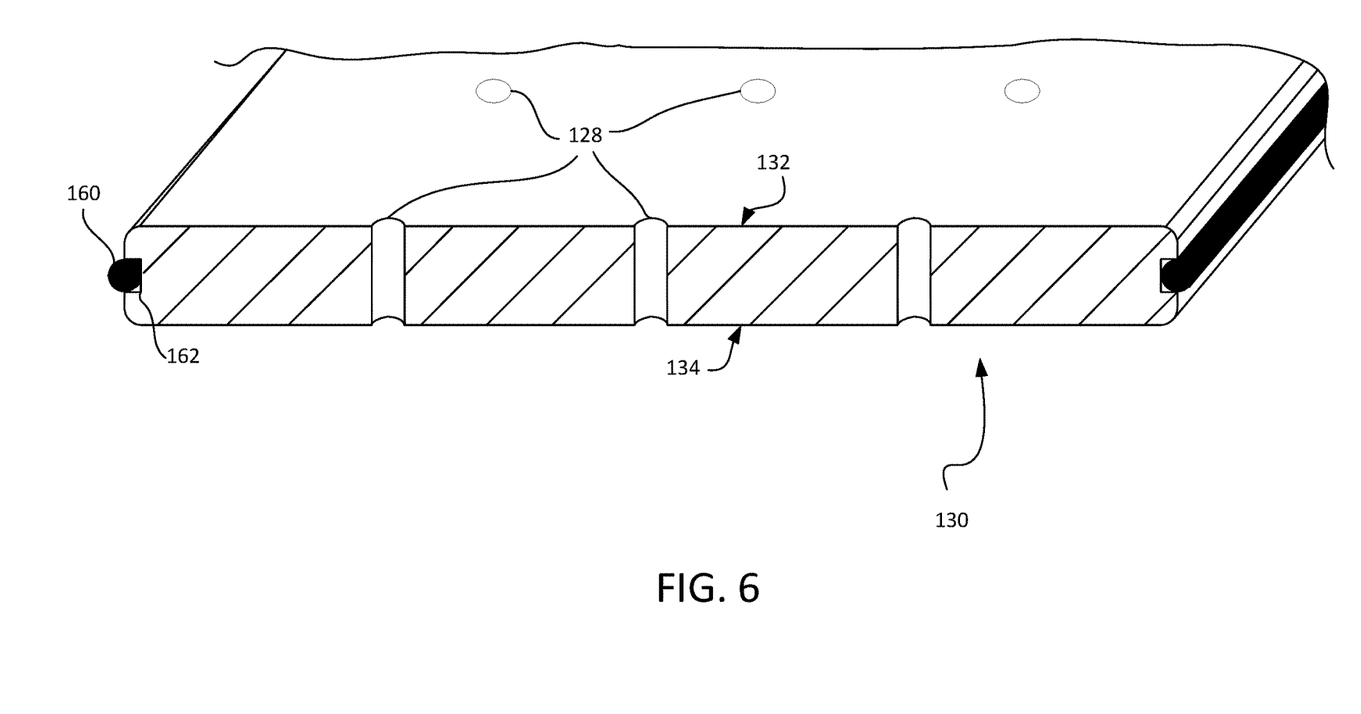
FIG. 6 illustrates a cross-sectional view of the immersion food defrosting device of FIG. 5.
Figure 7:
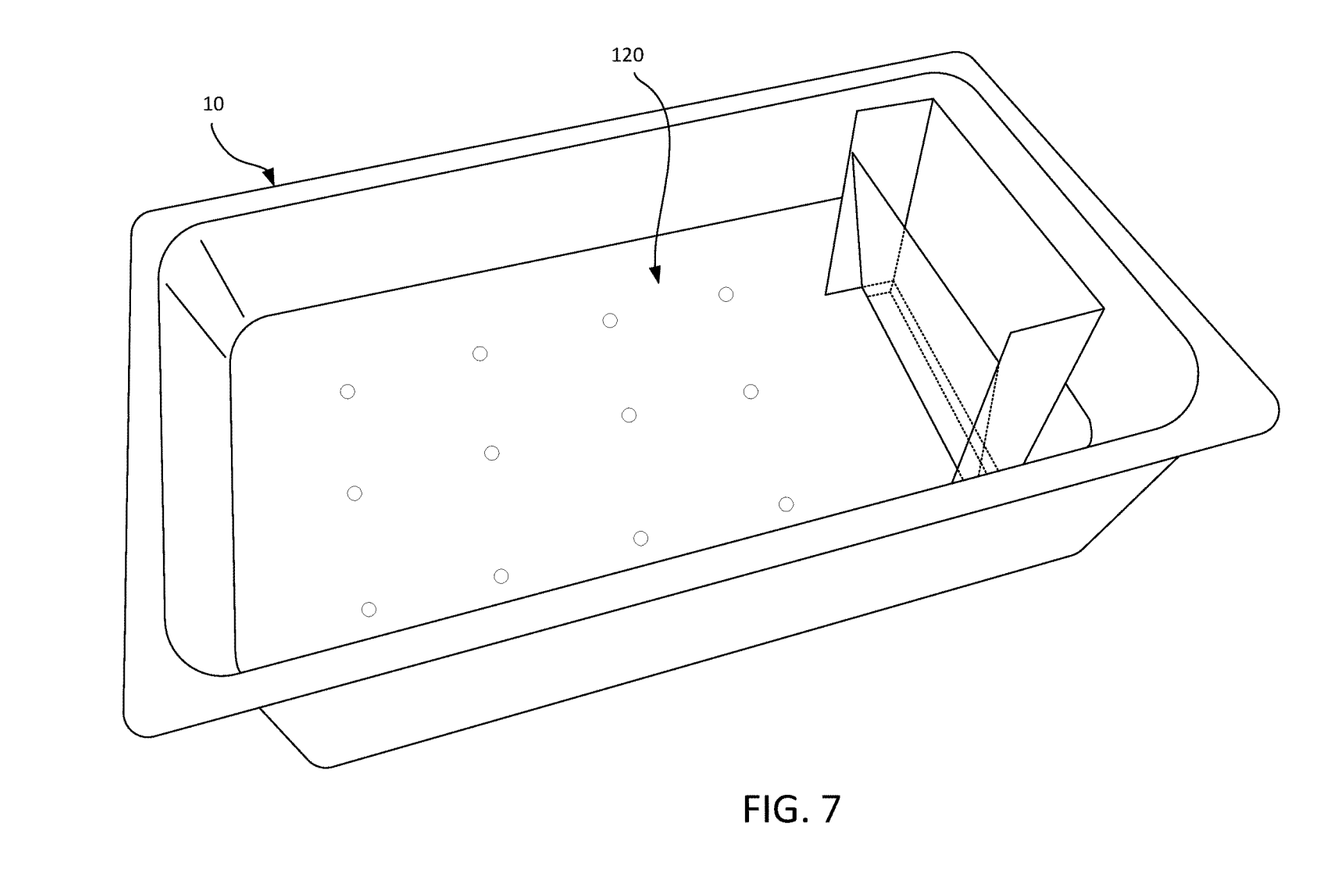
FIG. 7 illustrates the immersion food defrosting device of FIG. 5 placed in the basin of FIG. 2.
Figure 8:
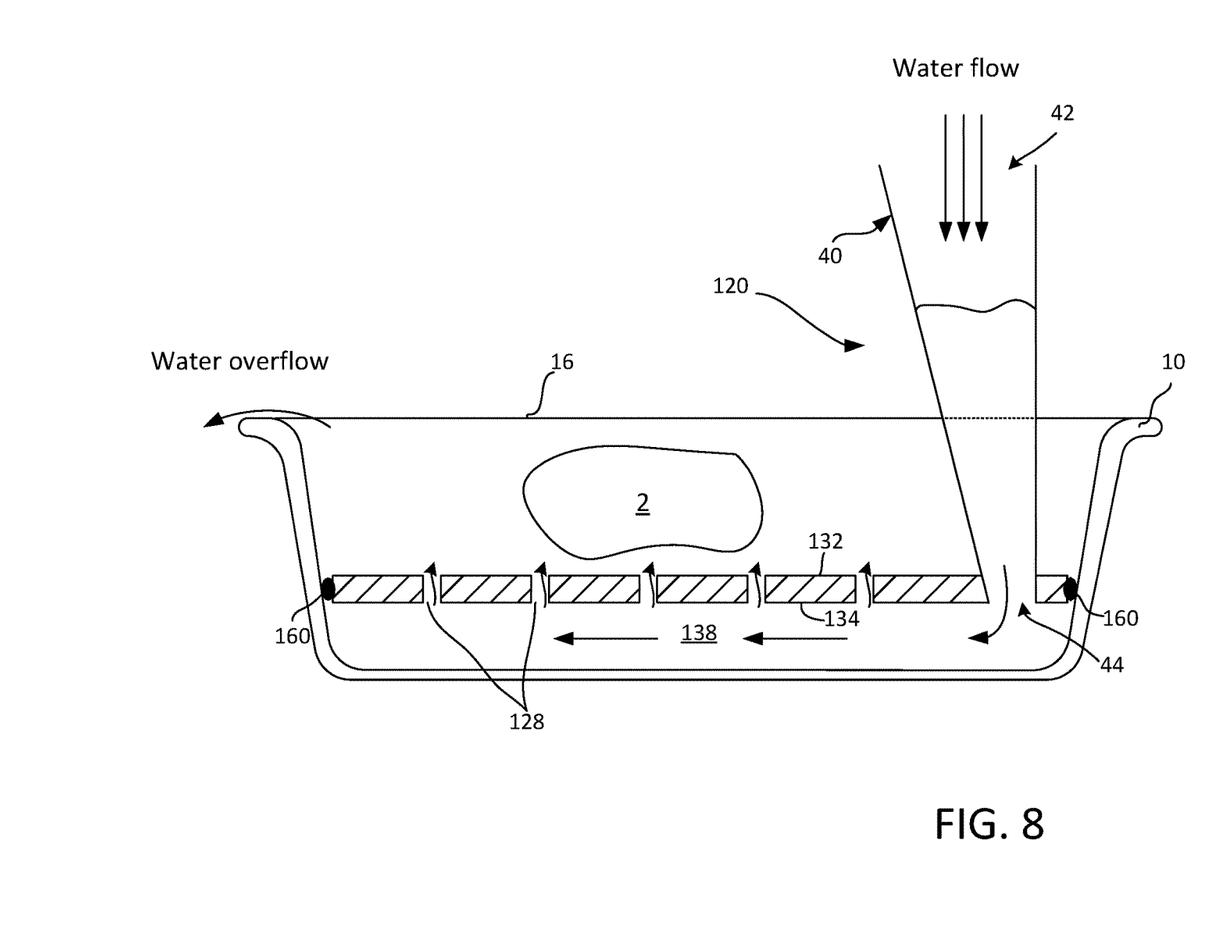
FIG. 8 illustrates a cross-sectional view of the immersion food defrosting device of FIG. 5 placed in the basin of FIG. 2.

The manifold plate 130 has a peripheral edge 150 that is sized for conformal receipt within an interior of a basin 10. See FIGS. 2, 5, 7 and 8. That is, the peripheral edge 150 of the manifold plate 130 and an interior periphery of the basin have a substantially similar shape (e.g., correspondingly shaped). As shown in FIG. 6, which is a cross-section of FIG. 5 taken along section lines A-A', the manifold plate 130 is a substantially solid plate with the apertures 128 that pass through its surface. Disposed about the periphery 150 of the manifold plate is a seal 160. The seal 160, may be formed of any resilient element including, without limitation, natural materials and rubbers and synthetic materials (Ethylene-Propylene; EPDM, silicone etc.). Typically, the seal 160 is disposed within a peripheral recess or kerf 162 around the periphery 150 of the manifold plate 130. The seal 160 allows the periphery 150 manifold plate 130 to sealingly engage an inside periphery of the basin 10, when disposed therein. See FIGS. 7 and 8. Though discussed as creating a seal between the manifold plate 130 and the basin 10, it will be appreciated that the engagement between the plate 130 and basin need not prevent passage of all fluid flow. Rather, it is sufficient that a majority of the water received from the riser 40 passes through the plurality of apertures 128 while reducing the flow of water between the periphery 150 of the plate and inside periphery of the basin 10. As illustrated in FIG. 8, the basin 10 may include a tapered sidewall about it periphery to facilitate engagement with the manifold plate. However, this is not a requirement.

When the manifold plate 130 is disposed within the basin 10 such that the seal 160 substantially engages the inside periphery of the basin 10, the manifold plate 130 and a lower portion of the basin 10 define an enclosed manifold area 138. As above, water received by the riser 40 passes into the enclosed manifold area 138 below the manifold plate 130 and disperses through the plurality of apertures 128 in the manifold plate 130 and into the interior of the basin. As above, the water flows by a frozen food item 2 placed in the basin above the manifold plate while displacing water over a top edge 16 of the basin.

The number and size of the apertures 28 in the manifold body and/or apertures 128 the manifold plate 130 may be selected based on a desired flow rate (e.g., ½ gal/min). Further the pattern of the apertures 28 may be selected to direct water in desired locations within a basin. In one embodiment the number and size of the apertures 28 may vary based on proximity to the manifold riser 40 (e.g., smaller and/or fewer apertures near the riser outlet and larger and/or more outlets at locations further from the riser outlet) to more evenly disperse water into the basin. The density of apertures may also be selected based, for instance, on the size of the manifold body and/or manifold plate. By way of example, there may be 1 aperture per square inch of surface area of the manifold body/plate. Such density may be increased or decreased depending on desired use and/or fluid flow. Further, the apertures may be uniformly sized or utilize varying sizes. For example, apertures may be sized between about $\frac{1}{16}^{th}$ of an inch and about ½ of an inch. Even further, the apertures may be arranged in various patterns such as a rectangle, square, circle, or in any shape that may otherwise increase the flow of water as required. Finally, plugs may be provided (not shown) that allow a user to selectively open/close various apertures.

The devices may be of any size. For example the devices and basins may be sized for receipt in a standard sized commercial sink. This may allow for defrosting of multiple items at one time. However, the devices may be smaller specifically sized for individual frozen items. Further, larger devices may be provided that allow defrosting larger items or multiple of frozen items at one time. The devices may be constructed of any material. For example, the devices may be constructed using steel, aluminum, plastic, and/or food grade stainless steels or any combination of the same.

In use, a user disposes the device 20/120 into a basin 20. A frozen item 2 may then be placed into the basin above an upper surface of the device. Alternatively a spacing structure may be placed on top of the device to prevent a frozen food item from blocking some of the apertures. For instance, placing a porous or hollow structure on the device may promote the flow of defrosting fluid around the frozen item while preventing blockage of some of the apertures. In any embodiment, a water source supplies a flow of water to the riser causing the basin to fill and overflow with water. The rate of the supply of water to the device may be adjusted in any manner. For example, the rate of flow may initially be high to rapidly fill the basin. Subsequently a user may reduce the flow of water to a lower rate. The rate may be reduced to achieve a regulated water refresh rate as required by health regulations. Further the rate may be reduced or even stopped once the basin is filled.

In order to gauge the amount of water used by the devices, the devices may include one or more indicia lines 18 and or text on the riser 40. See, e.g., FIG. 4. The indicia lines and/or text may correspond to a volumetric fluid flow through the apertures in the manifold body/plate. In this regard, the indicia lines may correspond to a fluid flow based on the head pressure in the riser and the combined area of the apertures in the manifold body/plate. Adjusting the fluid flow to maintain a water level in the riser at an indicia line or between adjacent indicia lines allows a user to gauge the amount of water flowing through the device. This may allow a user to reduce water usage while maintaining a desired defrosting rate and/or to achieve a minimum flow rate to meet health and safety regulations. In order to better utilize the indicia on the riser, the riser may be made of a transparent or translucent material.

There are many alternatives to the specifics discussed herein. For example, the device may instead be used to cool an item disposed within a basin. Further, any of the features shown in any of the embodiments could be incorporated into or combined with any other feature or design discussed herein. As a further example, any of the functionality of any of the described components could be combined with other components or further separated.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

What is claimed:

1. A defrosting device configured for placement within an interior of a basin between an open top edge and closed bottom surface of the basin, comprising:
    a hollow body sized for receipt within the basin proximate to the closed bottom surface, the hollow body having:
        an upper plate;
        a lower plate spaced from the upper plate;
        at least a first sidewall connecting said upper plate and said lower plate, wherein said upper plate, said lower plate and said at least one sidewall define an enclosed interior of said hollow body;
        an array of apertures disposed along a length and across a width of said upper plate and extending through said upper plate, wherein said apertures fluidly connect said enclosed interior of said hollow body with the interior of the basin;
    a riser attached to said hollow body, said riser having front and rear walls and first and second sidewalls defining a hollow interior of said riser between an open inlet end and an open outlet end, wherein one of said front and rear walls is slanted such that said riser tapers from said open inlet end to said open outlet end, wherein said open inlet end is larger than said open outlet end and wherein:
    said open outlet end of said riser opens into said enclosed interior of said hollow body; and
    said open inlet end extends above the open top edge of the basin, when said hollow body is disposed within the basin, wherein water received in said open inlet end passes through said riser into said enclosed interior of said hollow body and disperses through said array of apertures.

2. The device of claim 1, wherein said riser comprises a rigid conduit, wherein said rigid conduit is fixedly attached to said hollow body.

3. The device of claim 2, wherein at least one sidewall of said rigid conduit further comprises:
    indicia corresponding to a combined fluid flow through said plurality of apertures relative to a fluid height in said riser.

4. The device of claim 1, wherein the sizes of said array of apertures vary in size.

5. The device of claim 1, wherein a top surface of said upper plate is a planar surface, wherein said array of apertures extend through said planar surface.

6. The device of claim 1, wherein said upper plate, said lower plate and said at least one sidewall define a rectangular prism.

* * * * *